US 12,479,017 B2

(12) United States Patent
Vinzant

(10) Patent No.: US 12,479,017 B2
(45) Date of Patent: Nov. 25, 2025

(54) BILLET ROLLING MILL EQUIPPED WITH A MANIPULATOR SUBASSEMBLY AND METHOD FOR CONTROLLING SUCH A ROLLING MILL

(71) Applicant: Forge Pat GmbH, Reinach BL (CH)

(72) Inventor: Guy Vinzant, Manigod (FR)

(73) Assignee: Forge Pat GmbH, Reinach BL (CH)

( * ) Notice: Subject to any disclaimer, the term of this patent is extended or adjusted under 35 U.S.C. 154(b) by 271 days.

(21) Appl. No.: 18/265,291

(22) PCT Filed: Dec. 8, 2021

(86) PCT No.: PCT/EP2021/084807
§ 371 (c)(1),
(2) Date: Jun. 5, 2023

(87) PCT Pub. No.: WO2022/122826
PCT Pub. Date: Jun. 16, 2022

(65) Prior Publication Data
US 2024/0033794 A1 Feb. 1, 2024

(30) Foreign Application Priority Data
Dec. 9, 2020 (EP) ..................................... 20212898

(51) Int. Cl.
*B21B 1/02* (2006.01)
*B21B 39/06* (2006.01)

(52) U.S. Cl.
CPC ................ *B21B 1/02* (2013.01); *B21B 39/06* (2013.01); *B21B 2001/022* (2013.01)

(58) Field of Classification Search
CPC ... B21H 1/20; B21H 1/22; B21J 13/10; B21B 1/02; B21B 1/026; B21B 2001/022; B21B 39/06

(Continued)

(56) References Cited

U.S. PATENT DOCUMENTS 1,474,124 A * 11/1923 Steinecke ............... B21B 21/04
72/252
3,948,070 A * 4/1976 Hentzschel ............. B21B 21/04
72/252
5,001,916 A * 3/1991 Schuler .................... B21B 1/42
72/100

FOREIGN PATENT DOCUMENTS

| CN | 108296292 B | 8/2020 |
|---|---|---|
| DE | 10 2013 100 302 A1 | 7/2014 |
| FR | 2 390 224 | 12/1978 |

OTHER PUBLICATIONS

Translation, FR 2390224A1 Leleu Aug. 1978.*

(Continued)

*Primary Examiner* — Edward T Tolan
(74) *Attorney, Agent, or Firm* — Troutman Pepper Locke LLP

(57) ABSTRACT

The billet rolling mill comprises two rolls for shaping a blank, each shaping roll being provided with at least one rolling tool and being rotated about an axis of rotation by a drive motor, and a manipulator subassembly for moving the blank with respect to the shaping rolls. The manipulator subassembly comprises a clamp gripping the blank and a carriage moving the clamp at least along a direction of rolling of the blank. The manipulator subassembly comprises a linear motor moving the carriage along the direction of rolling. The direction of rolling is perpendicular to the axis of rotation of the rolling tool. The linear motor is configured for accelerating the blank and selectively exerting on the blank, either a tensile force, to extract the blank from a gap defined between the rolling tools, or a braking force, to limit a speed of ejection of the blank.

18 Claims, 12 Drawing Sheets

(58) Field of Classification Search
USPC .......................................................... 72/213
See application file for complete search history.

(56) References Cited

OTHER PUBLICATIONS

CN 11872197A, Zhao et al. Nov. 2020.*
DE 102014011501A1, Barnickel Jul. 2015.*
DE 102014011511A1, Barnickel Jul. 2015.*
EP 2316589A1, Kriesl May 2011.*
JP 05-215537A, Hashizuma et al. Aug. 1993.*
WO 2012/007231A1, Selb et al. Jan. 2012.*
DE 10259814B4, Mizuguchi et al. Nov. 2008.*
Rapport De Recherche Europeenne issued in European Patent Application No. 20 21 2898 dated May 11, 2021.
Rapport De Recherche Internationale issued in International Patent Application No. PCT/EP2021/084807 dated May 4, 2022.

* cited by examiner

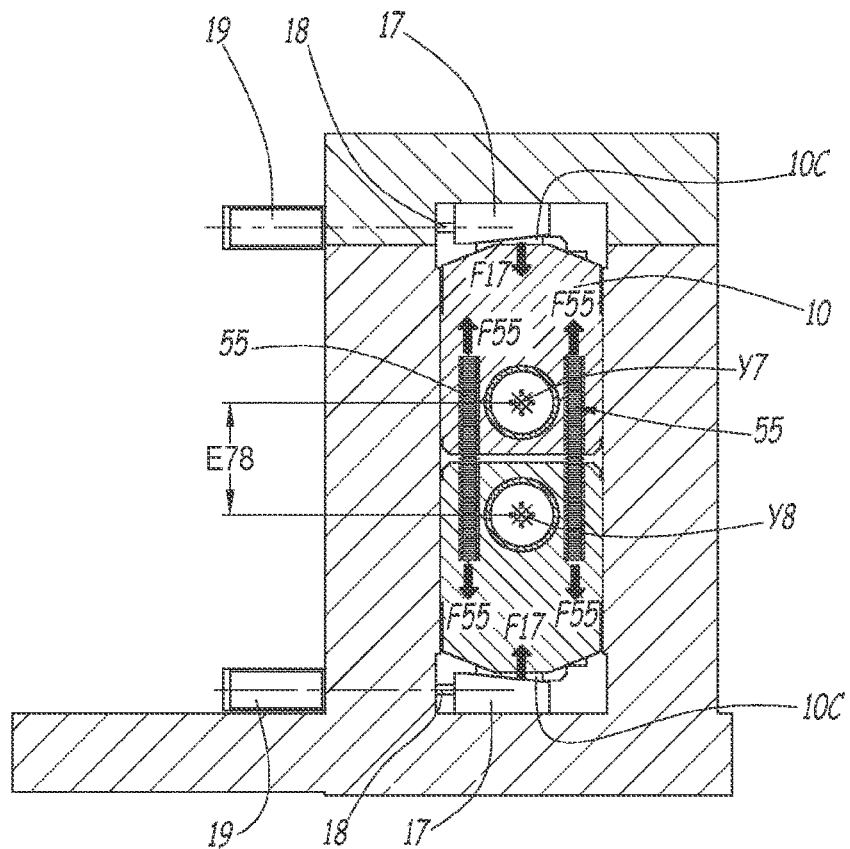
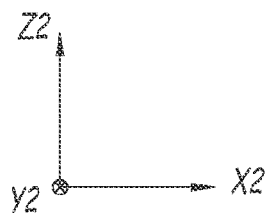
FIG.4

BILLET ROLLING MILL EQUIPPED WITH A MANIPULATOR SUBASSEMBLY AND METHOD FOR CONTROLLING SUCH A ROLLING MILL

CROSS REFERENCE TO RELATED APPLICATIONS

The present application is a U.S. National Phase application under 35 U.S.C. § 371 of International Patent Application No. PCT/EP2021/084807 filed Dec. 8, 2021, which claims priority of European Patent Application No. 20212898.9 filed Dec. 9, 2020. The entire contents of which are hereby incorporated by reference.

FIELD OF THE INVENTION

The present invention relates to a billet rolling mill comprising, inter alia, two shaping rollers for the hot shaping of a blank to be shaped, and a manipulator subassembly used for moving such blank with respect to said rollers. The present invention further relates to a method for controlling such a rolling mill.

BACKGROUND

In a billet rolling mill, the blanks or billets generally consist of a bar of steel, aluminum or titanium, with a cylindrical or rectangular cross-section. The rolling of each blank or billet is a hot-rolling, performed in a plurality passes between two shaping rolls which rotate synchronously and in opposite directions. Each shaping roll carries a stack of tools in a portion of a roll, each tool defining a profile for shaping, along the longitudinal direction, the volume of material forming the blank. The rolling operation is carried out by feeding the blank between the shaping rolls and then passing the blank between two tools of a pair of tools, in translation along a direction of said direction of rolling, the two tools being mounted on the two shaping rolls, respectively.

After each pass between the two tools of a pair of tools, the blank is moved in translation, along a direction parallel to the axes of rotation of the rolls, for being placed opposite the next pair of tools, before starting a new rolling pass by inserting the blank again between the shaping rolls and then shaping the blank again by passing same between the tools of the next pair, along the direction of rolling. The operation is repeated as many times as necessary to shape the blank, until the desired geometry is reached, by successive passes through the pairs of tools mounted on the two shaping rolls, respectively. Optionally, the orientation of the blank about the longitudinal axis thereof can vary between the different rolling steps.

In order to let the movements of the blank take place with respect to the pair of shaping rolls, it is known how to equip a billet rolling mill with a manipulator subassembly which comprises a clamp for gripping the blank and is used for moving the latter along the direction of rolling and, where appropriate, parallel to the axes of rotation of the rolls. The movements of the manipulator subassembly have to be synchronized with the rotation of the shaping rolls. Furthermore, the movements have to be precise and rapid since same contribute to the geometry of the rolled part and to the definition of the total cycle time of the rolling.

When the blank is being rolled, same is in contact with the tools mounted on the two shaping rolls, said tools having variable diameters, depending on the geometry to be given to the blank. The variable character of the tool diameter prevents the linear speed of the blank along the direction of rolling from being precisely determined by the relation $v = r \ast \omega$, where $v$ is the linear speed of the blank, $r$ is the radius of the tool and $\omega$ is the angular speed of rotation of the roll. Furthermore, due to the rolling operation, an elongation of the blank occurs, which is not fully controlled. The linear speed of the blank during rolling is thus not very precisely known.

In certain known rolling mills, a manipulator subassembly comprises a ram which carries a blank gripping clamp and which is actuated for pushing the blank between the shaping rolls, the tools of which are then in a configuration spaced apart from each other. The rollers of the shaping rolls are then actuated for rotating in the opposite direction and the rollers return the blank, along the direction of rolling, to the manipulator subassembly the ram of which is then deactivated so as to follow the movement imparted to the blank by the tools of the two shaping rollers which rotate. As a result of the return movement of the blank along the direction of the manipulator subassembly and after lateral offset of the blank, the ram is again pressurized for inserting the blank again between the shaping rollers, for a subsequent rolling step. The adjustment of such a roll is relatively difficult, whereas the movement of the blank during rolling, when the blank is returned towards the manipulator subassembly, is not really controlled since the ram is then a follower.

It is known from CN-B-108296292 how to use, as an actuator, a linear motor in a rolling mill of a type different from the type of the invention, where rolling tools have the axes thereof slightly inclined with respect to a direction of rolling. Such rolling mill comprises an axial thrust system and a recovery system located on both sides of the rolling tools. The use of a separate axial thrust system and recovery system is complex and expensive.

It is also known from FR-A-2390224 how to use, in an independent manipulation system of a rolling mill, a linear motor for driving an automatic manipulator which includes a gripper clamp. The rolling mill as such has no manipulation system, since the manipulation system has to be able to be moved away for providing access to a working area for the tools of the rolling mill. The linear motor is used for driving a sleeve, with a movement synchronous with the [movement of] rolls of the rolling mill, which only allows the movement of the blank to be accompanied during rolling.

SUMMARY

It is such drawbacks that the invention intends most particularly to overcome by proposing a new billet rolling mill the manipulation subassembly of which allows a more effective control of the rolling operations.

To this end, the invention relates to a billet rolling mill comprising two shaping rolls for shaping a blank, each shaping roll being provided with at least one rolling tool and being rotated about an axis of rotation by at least one respective drive motor. The billet rolling mill further comprises a manipulator subassembly for moving the blank with respect to the shaping rolls, the manipulator subassembly comprising a clamp for gripping the blank and a carriage for moving the clamp at least along one direction of rolling of the blank. The manipulator subassembly comprises at least one linear motor for moving the carriage along the direction of rolling. According to the invention, the direction of rolling is perpendicular to the axis of rotation of the rolling tool. Furthermore, the linear motor is configured for accelerating the blank, so as to insert the blank between the rolling tools with a speed synchronized with the speed of the rolling tools, and for selectively exerting on the blank, either a tensile force, which tends to extract the blank from a gap defined between the rolling tools, or a braking force, which tends to limit a speed of ejection of the blank.

By means of the invention, the linear speed of movement of the blank along the direction of rolling is defined by the linear motor, and thus precisely controlled. A precise adjustment of the movement of the blank along the direction of rolling can be obtained by exerting, by means of the linear motor, an additional tensile force compared to the force applied on the blank by the rolling tools during rotation or, on the contrary, a braking force. The additional tensile or braking force results from the electromagnetic force exerted between the primary and secondary magnetic elements of the linear motor. The force can be controlled precisely and quickly, making the billet rolling mill of the invention compatible with high-rate production.

According to advantageous but non-mandatory aspects of the invention, such a billet rolling mill can incorporate one or a plurality of the following features, taken individually or according to any technically permissible combination:

The carriage is also movable along a transverse direction, perpendicular to the direction of rolling and parallel to the axes of rotation of the shaping rolls, while the manipulator subassembly comprises at least one linear motor for moving the carriage along the transverse direction.

Each linear motor comprises a primary magnetic element supplied with current and a secondary magnetic element not supplied with current, and means for guiding the primary and secondary magnetic elements in relative translation.

The guiding means comprise at least one rail mounted on a first part of the manipulator subassembly, which carries a first magnetic element among the primary magnetic element and the secondary magnetic element, and a slide mounted on a second part of the manipulator subassembly, which carries the second magnetic element among the primary magnetic element and the secondary magnetic element.

The guiding means comprise two sets of rails and slides, arranged on both sides of the primary magnetic element and of the secondary magnetic element.

The primary magnetic element of the linear motor for moving the carriage along the direction of rolling is mounted on a frame movable in translation along the transverse direction, while the secondary magnetic element of the linear motor for moving the carriage along the direction of rolling is mounted on the carriage.

The primary magnetic element of the linear motor for moving the carriage in the transverse direction is mounted on a frame movable in translation along the transverse direction, while the secondary magnetic element of the linear motor for moving the carriage along the transverse direction is rigidly attached to a fixed structure of the billet rolling mill.

A center distance between the axes of rotation of the shaping rolls is adjustable by means of a cam mechanism, which exerts a force on the shaping rolls tending to reduce the center distance, and an elastic system, which exerts on the shaping rolls a force tending to increase the center distance.

The carriage carries an electric motor for maneuvering the clamp.

A damper system is arranged between an output shaft of the electric motor and a maneuvering push-rod of an opening/closing mechanism of the clamp.

The carriage carries an electric motor for the angular orientation of the clamp about an axis parallel to the direction of rolling.

The electric orientation motor controls the angular orientation of the clamp, about the axis parallel to the direction of rolling, over a range, the angular amplitude of which depends on the activation time of the electric orientation motor.

The electric orientation motor rotates a hollow rod at one end of which is mounted a mechanism for opening/closing the clamp, while the electric motor for maneuvering the clamp translates a push-rod arranged inside the rod and which acts on the opening/closing mechanism of the clamp.

Each shaping roll is rotated about the axis of rotation thereof by two electric motors, one of which is mounted near each of the ends thereof.

A reduction gear is interposed between an output shaft of each electric motor and the adjacent end of a roller of the shaping roll driven by the motor.

According to a second aspect, the invention relates to a method for controlling a rolling mill of the aforementioned type, which comprises steps implemented by supplying a primary magnetic element of the linear motor and consisting of accelerating the blank, in order to insert same between the rolling tools, to a speed synchronized with the speed of the rolling tools, and selectively exerting on the blank either a tensile force which tends to extract the blank from a gap defined between the rolling tools, or a braking force which tends to limit a speed of ejection of the blank.

BRIEF DESCRIPTION OF THE DRAWINGS

The invention will be better understood and other advantages thereof will appear more clearly in the light of the following description of an embodiment of a rolling mill according to the principle thereof, given only as an example and made with reference to the enclosed drawings, wherein:

FIG. 4 is a section similar to FIG. 3 when the shaping rolls are in a second configuration;

DETAILED DESCRIPTION

Figure 1:
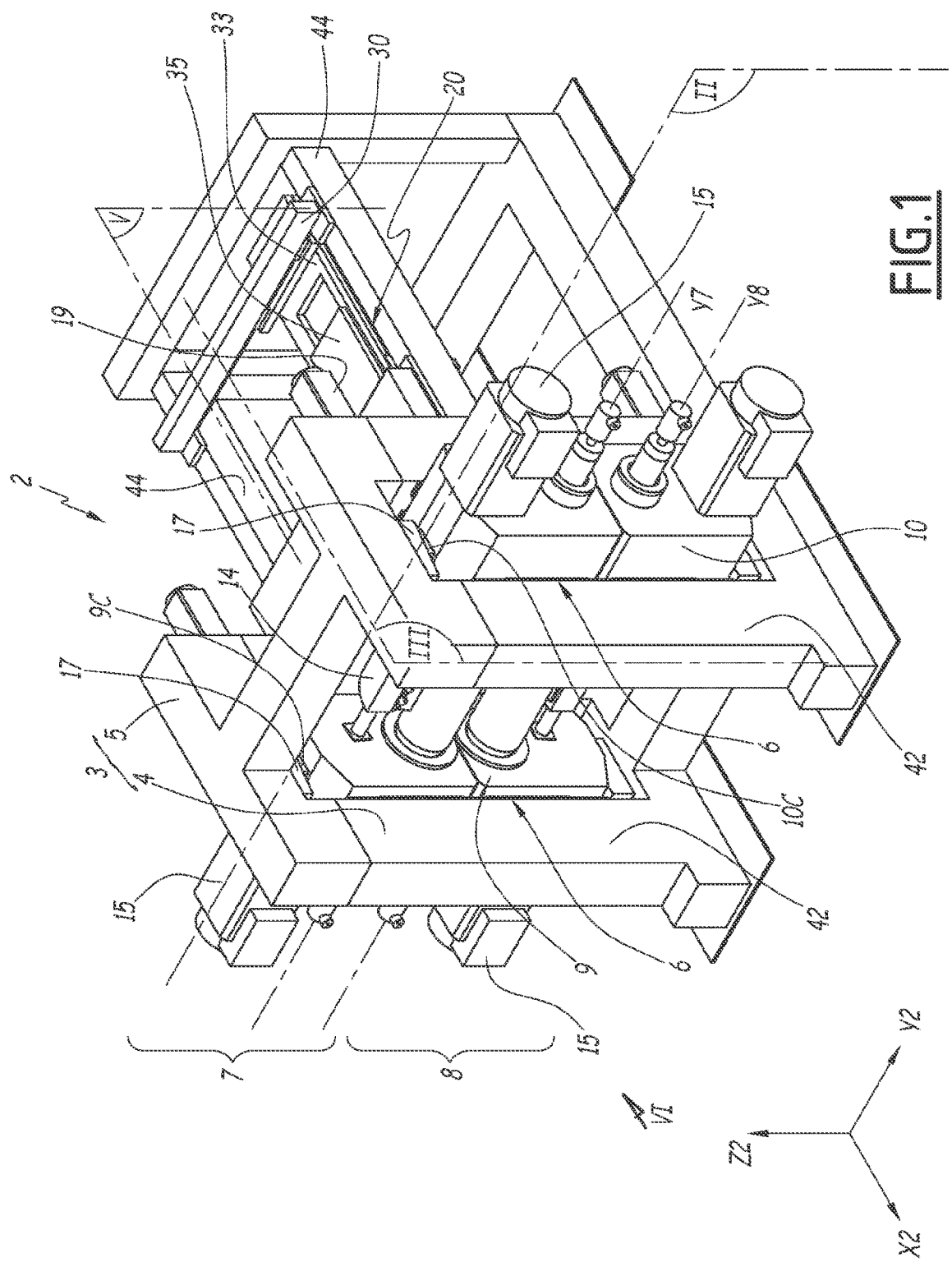
FIG. 1 is a perspective view of a billet rolling mill according to the invention.

A billet rolling mill 2 shown in FIGS. 1 to 12 comprising a frame 3 consisting of a fixed structure 4 and a removable upper crosspiece 5. The fixed structure 4 supports two guide systems 6 for a vertical movement of an upper shaping roll 7 and a lower shaping roll 8 mounted one above the other and each provided with a stack of rolling tools 72 and 82, respectively, which extend over a part of the circumference and the length of a roller 74, and 84, respectively.

Each of the stacks 72 and 82 is formed by the juxtaposition, along a roller 74 or 84, of individual tool parts which work in pairs and are intended to hot shape a blank or billet E. The number of individual parts of tool(s) of a stack 72 or 82 is at the choice of the user of the rolling mill 2. Hereinafter, for simplicity, the stacks 72 and 82 of tools are referred to as "tools".

Each shaping roll 7 or 8 is supported, with respect to the fixed structure 4, by two block bearings, namely a left-hand block bearing 9 and a right-hand block bearing 10. The block bearings 9 and 10 are guided in vertical translation by the guide systems 6 and are arranged between two uprights 42 of the fixed structure. Since the crosspiece 5 is removable, the block bearings 9 and 10 can be placed between the uprights 42 and removed during maintenance operations of the rolling mill 2.

Figure 2:
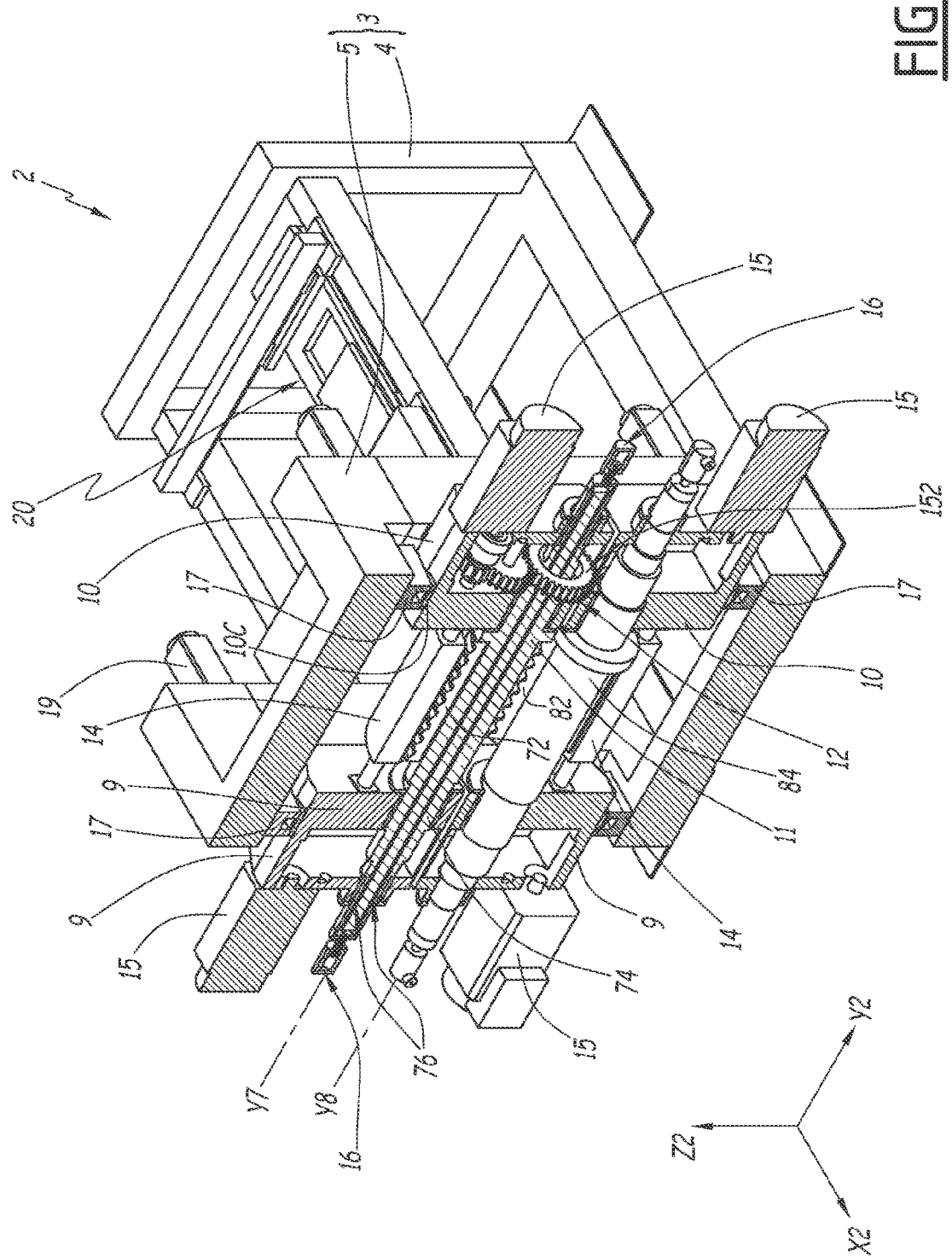
FIG. 2 is a perspective view at the same angle of the rolling mill shown in FIG. 1, with a partial section at the plane II shown in FIG. 1.

Each block bearing 9 or 10 supports an electric motor 15 the output shaft of which rotates the roller 74 or 84 of the associated shaping roll 7 or 8, through a reduction gear 152 integrated into the block bearing. Only one reduction gear 152 is shown in FIG. 2, associated with the electric motor 15 shown at the top right of the figure. Equivalent reduction gears (not shown in the figure) are associated with the other three motors 15 and are arranged between the output shafts of the motors and the rollers 74 or 84, in a block bearing 9 or 10. Each roller 74 or 84 is thus rotated by two motors 15, through the associated reduction gear 152, about an upper axis of rotation Y7 or a lower axis of rotation Y8, the axes being parallel to each other.

In the above example, the electric motors 15 are of the type marketed by SIEMENS under the reference 1PH8. Other types of motors are conceivable.

The different electric motors 15 are controlled by an electronic control unit (not shown), which synchronizes the torques exerted on the same roller 74 or 84 by the two motors 15 arranged close to the two ends thereof.

An orthogonal coordinate system X2, Y2, Z2 is associated with the rolling mill 2, with the horizontal axis X2 thereof directed towards the shaping rolls 7 and 8, the axis Y2 thereof parallel to the axes of rotation Y7 and Y8 and the vertical axis Z2 thereof directed upwards.

A heating system 14 partially surrounds each shaping roll 7 or 8. More precisely, each heating system 14 surrounds the roller 74 or 84 of the adjacent shaping roll 7 or 8 over an angular sector of apex angle α equal to about 120° and over the length of the tools 72 or 82.

In the configuration of FIGS. 1 to 6, each of the rollers 74 and 84 is oriented, about the axis of rotation Y7 or Y8 thereof, in such a way that the tools 72 or 82 which the roller supports, are directed facing the adjacent heating system 14. In such configuration, the two heating systems 14 can heat the tools 72 and 82, by radiation. On the other hand, as can be seen only for the upper shaping roll 7 in FIG. 2, channels 76 for the circulation of a heat-transfer fluid, such as water, are formed inside each of the rollers 74 and 84 and connected to two rotary seals 16 connected to conduits (not shown) for bringing in and for discharging the heat-transfer fluid. The circulation of the heat-transfer fluid through the channels 76 makes it possible to cool, during rolling, each of the rollers 74 and 84.

A vertical center distance E78 between the axes Y7 and Y8, which is measured parallel to the axis Z2, is controlled by means of four wedges 17 movable parallel to the axis X2 and each controlled through a screw-and-nut system 18 by means of an electric motor 19. The rotational movement of the output shaft of each electric motor 19 is transformed, by the associated screw-nut system 18, into a translational movement of the wedge 17.

In the above example, the electric motors are of the type marketed by SIEMENS under the reference 1FK7. Other types of motors are conceivable.

A wedge 17 is provided above each of the block bearings 9 and 10 of the upper shaping roll 7 and a wedge 17 is provided below each of the block bearings 9 and 10 of the lower shaping roll 8.

Figure 3:
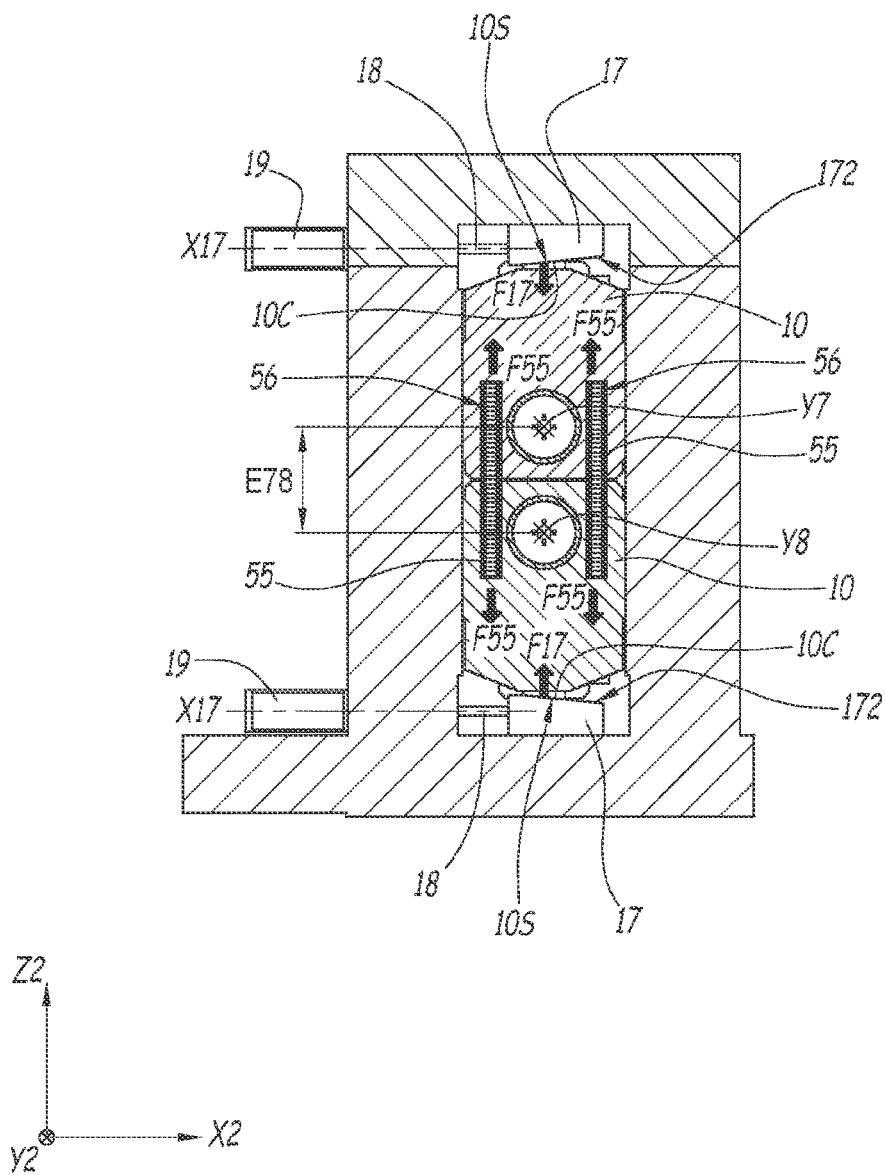
FIG. 3 is a principle section along the plane III shown in FIG. 1, when the shaping rolls of the rolling mill are in a first configuration.
Figure 5:
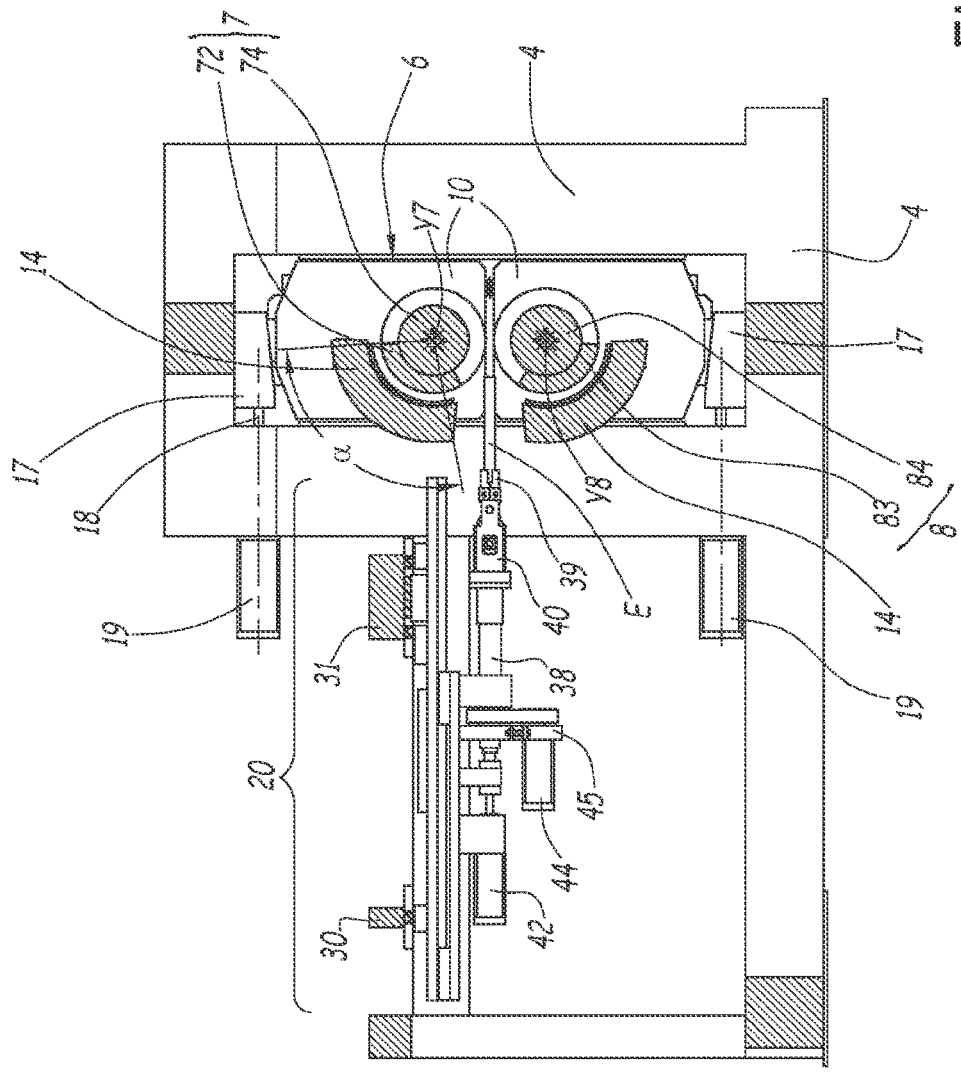
FIG. 5 is a principle section along the plane V shown in FIG. 1.
Figure 6:
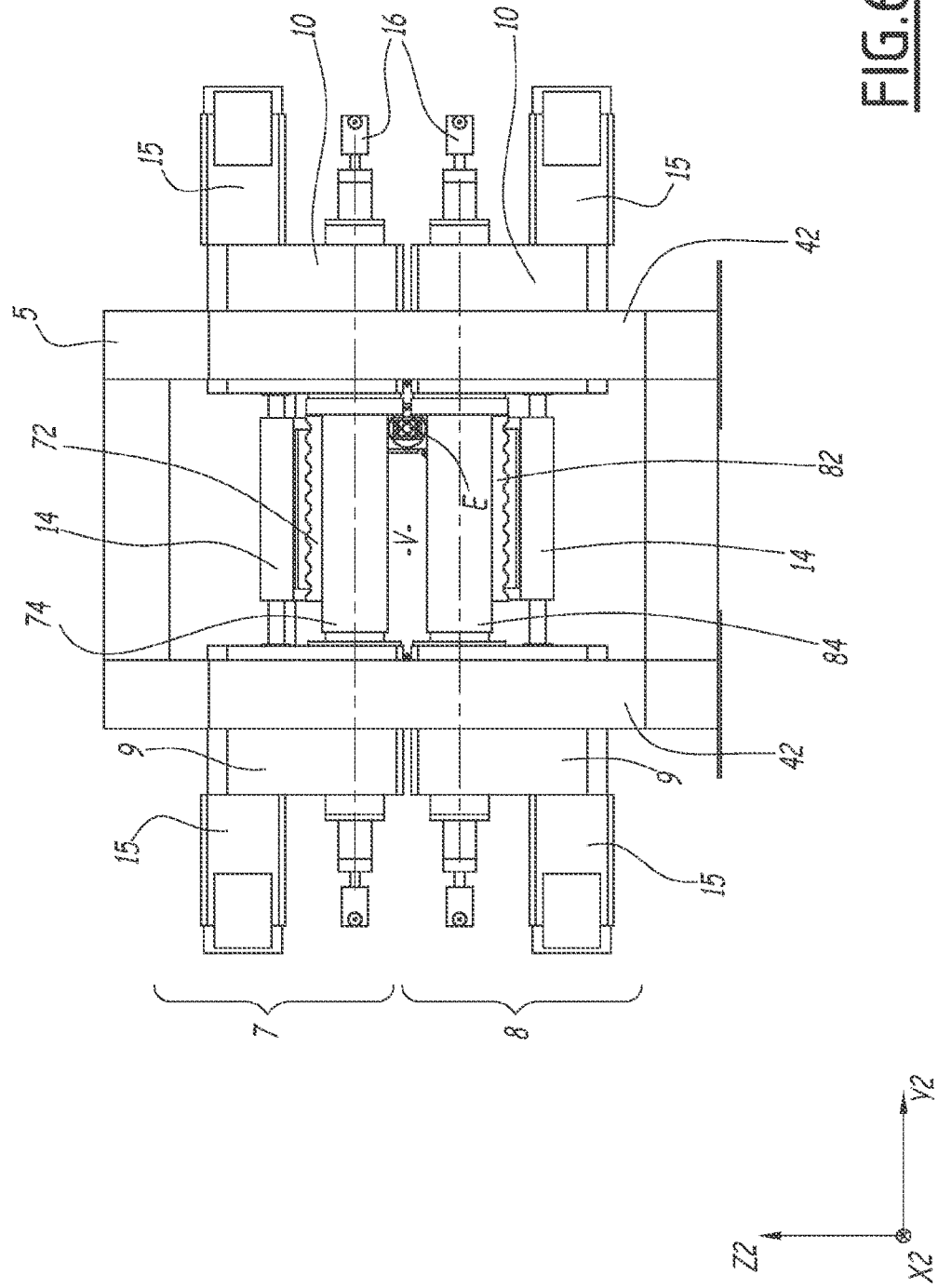
FIG. 6 is a front view of the rolling mill along the arrow VI shown in FIG. 1.
Figure 7:
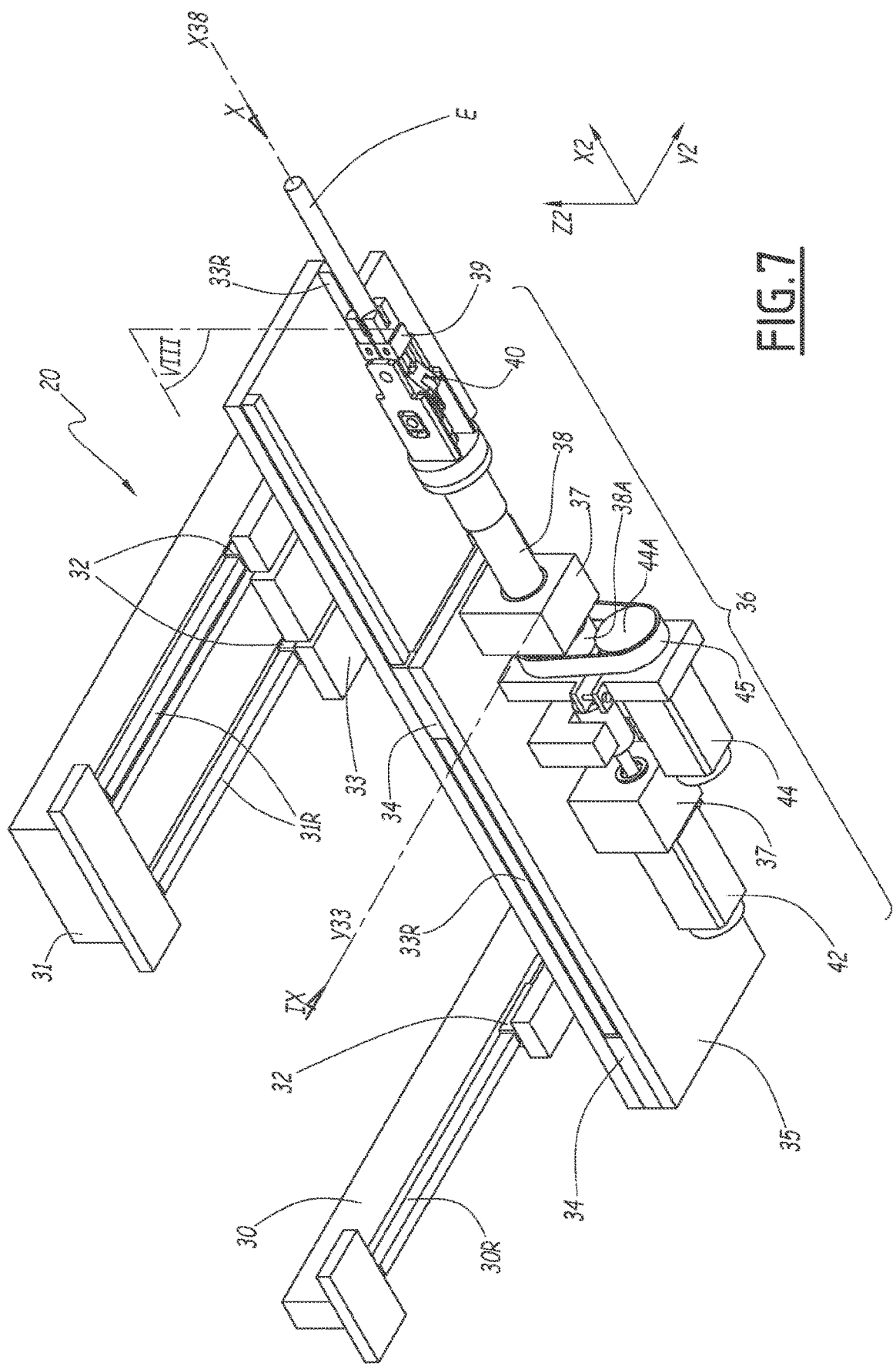
FIG. 7 is a perspective bottom view of the manipulator subassembly shown in the FIGS. 1 to 6.
Figure 8:
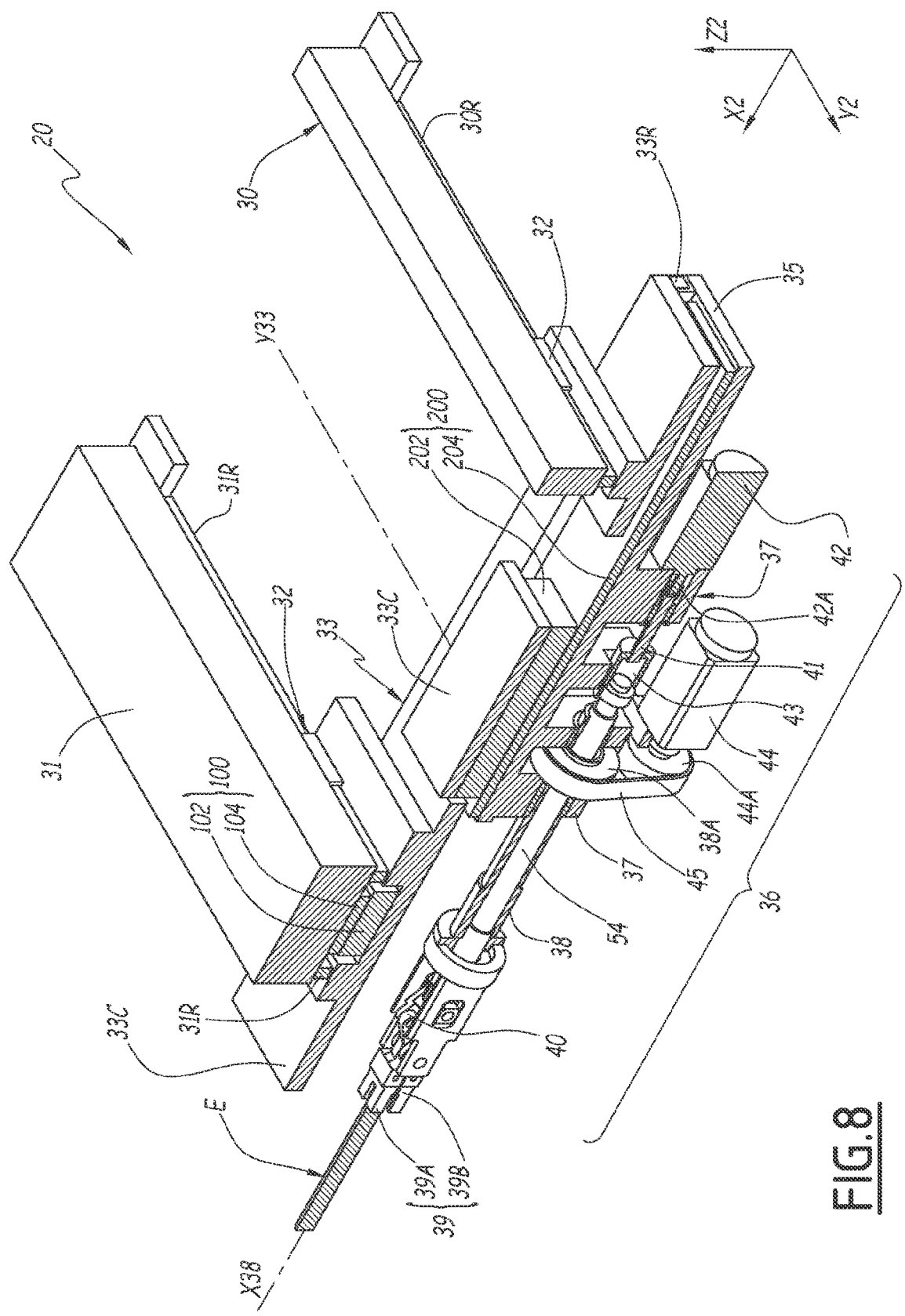
FIG. 8 is a perspective view, at another angle and in section along the plane VIII shown in FIG. 7, of the manipulator subassembly shown in FIG. 7.
Figure 9:
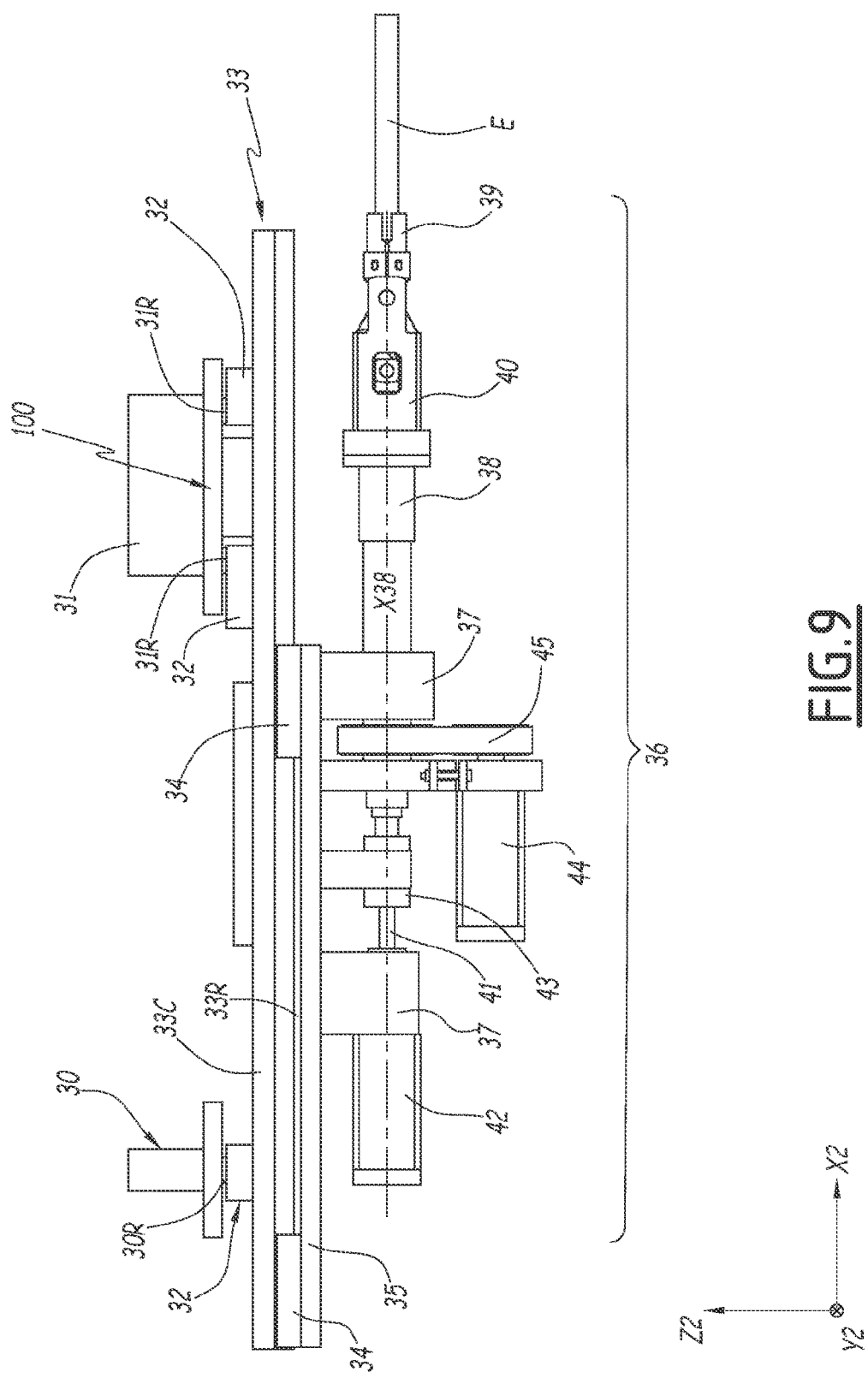
FIG. 9 is a side view of the manipulator subassembly of FIGS. 7 and 8, along the direction of the arrow IX shown in FIG. 7.
Figure 10:
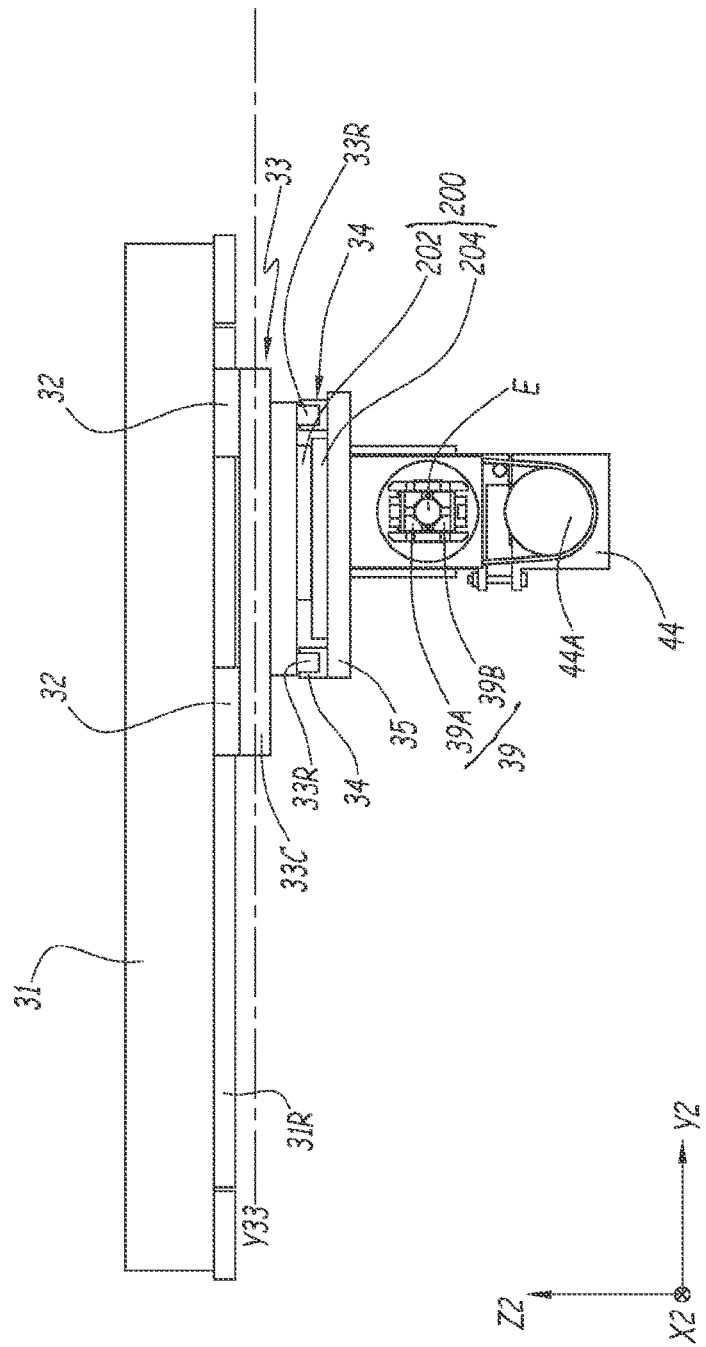
FIG. 10 is an end view of the manipulator subassembly, along the arrow X shown in FIG. 7, the blank not being shown.

Each wedge 17 moves along an axis X17 parallel to the axis X2 and has a cam surface 172 inclined with respect to the axis X17 in the plane of FIGS. 3 and 4.

On the other hand, each block bearing 9 or 10 is equipped with a cam 9C or 10C which has a sliding surface against the surface 172 of a wedge 17. The sliding surface is identified by the reference 10S for the shims 100 visible in FIGS. 3 and 4. The sliding surfaces of the cams 9C are parallel to the sliding surfaces 10S of the cams 10C. The sliding surfaces 10S and equivalent are also inclined with respect to the axis X17 in the plane of FIGS. 3 and 4.

The inclined surfaces 172 and 10S correspondingly provided on the wedges 17 and on the cams 9C and 100 are oriented in such a way that same bear against each other's surfaces thereof and that, when the wedges 17 are displaced along the direction of the axis X2, each wedge exerts on the cams 9C or 10C, a force F17 which pushes the block bearings 9 and 10 towards each other, which tends to reduce the vertical distance between the axes Y7 and Y8.

On the other hand, two spring assemblies 55 are arranged in housings 56 provided in the block bearings 9 and 10, respectively. The springs 55 exert an elastic force of vertical separation of the block bearings. The elastic force, represented by the arrows F55 in FIGS. 3 and 4, tends to increase by default the vertical center distance between the axes Y7 and Y8. Thus, when the force for bringing the block bearings closer together is released, due to a translation of the wedges 17 parallel to the axis X17 along a direction opposite to the direction of the axis X2, the springs 55 move the block bearings 9 and 10 vertically apart, which increases the vertical center distance E78 between the axes Y7 and Y8 and corresponds to the change from the configuration shown in FIG. 3 to the configuration shown in FIG. 4.

The combination of the cam mechanism formed by the parts 9C, 10C and 17, on the one hand, and of the elastic system formed by the springs 55, on the other hand, is used for a precise control of the vertical center distance E78 between the axes Y7 and Y8, by means of the motors 19.

Preferentially, the operation of the electric motors 19 is synchronized, in order to coordinate the movement of the wedges 17 along the axes of translation X17 thereof. In this way, the block bearings 9 and 10 are prevented from being placed at an angle between the guide systems 6.

The electric motors 19 are synchronized by an electronic unit (not shown) which is advantageously the same as the unit which controls the electric motors 15.

A manipulator subassembly 20 is provided for
loading a blank E, in other words a billet, between the shaping rolls 7 and 8,
accompanying the ejection movement of the blank, related to the action of tools 72 and 82 and
laterally offsetting the blank parallel to the axis Y2, in order to make the blank cooperate successively with a plurality of parts of the tools 72 and 82, the parts of the tools being juxtaposed along the rollers 74 and 84.

The manipulator subassembly 20 is supported by the frame 3, so that same is permanently correctly positioned with respect to the rolls 7 and 8. The manipulator subassembly does not hinder the access to the rolls, in particular to the tools 72 and 82 thereof.

Figure 11:
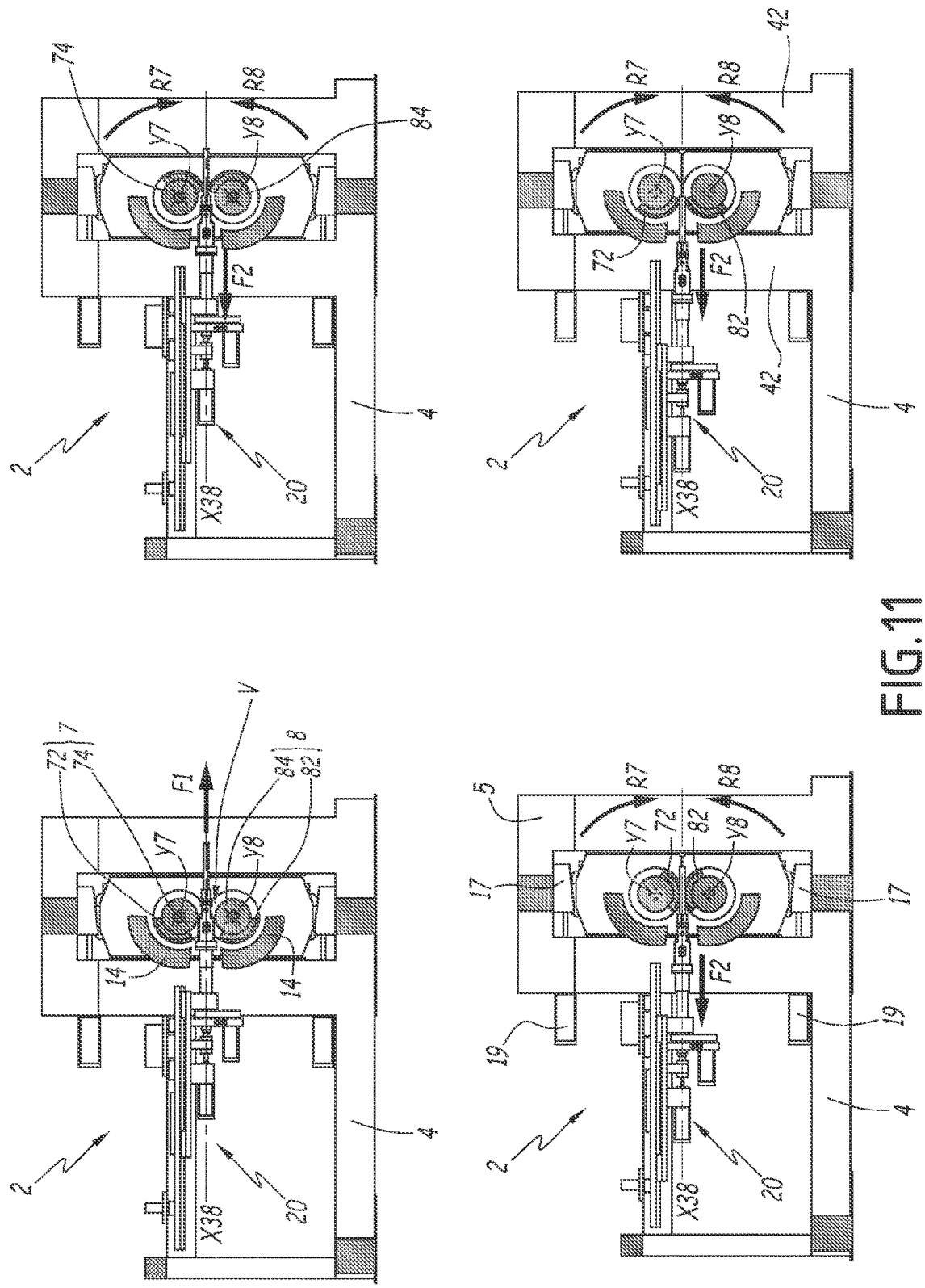
FIG. 11 is a four-step representation, in the plane of FIG. 5, of the rolling of a blank.
Figure 12:
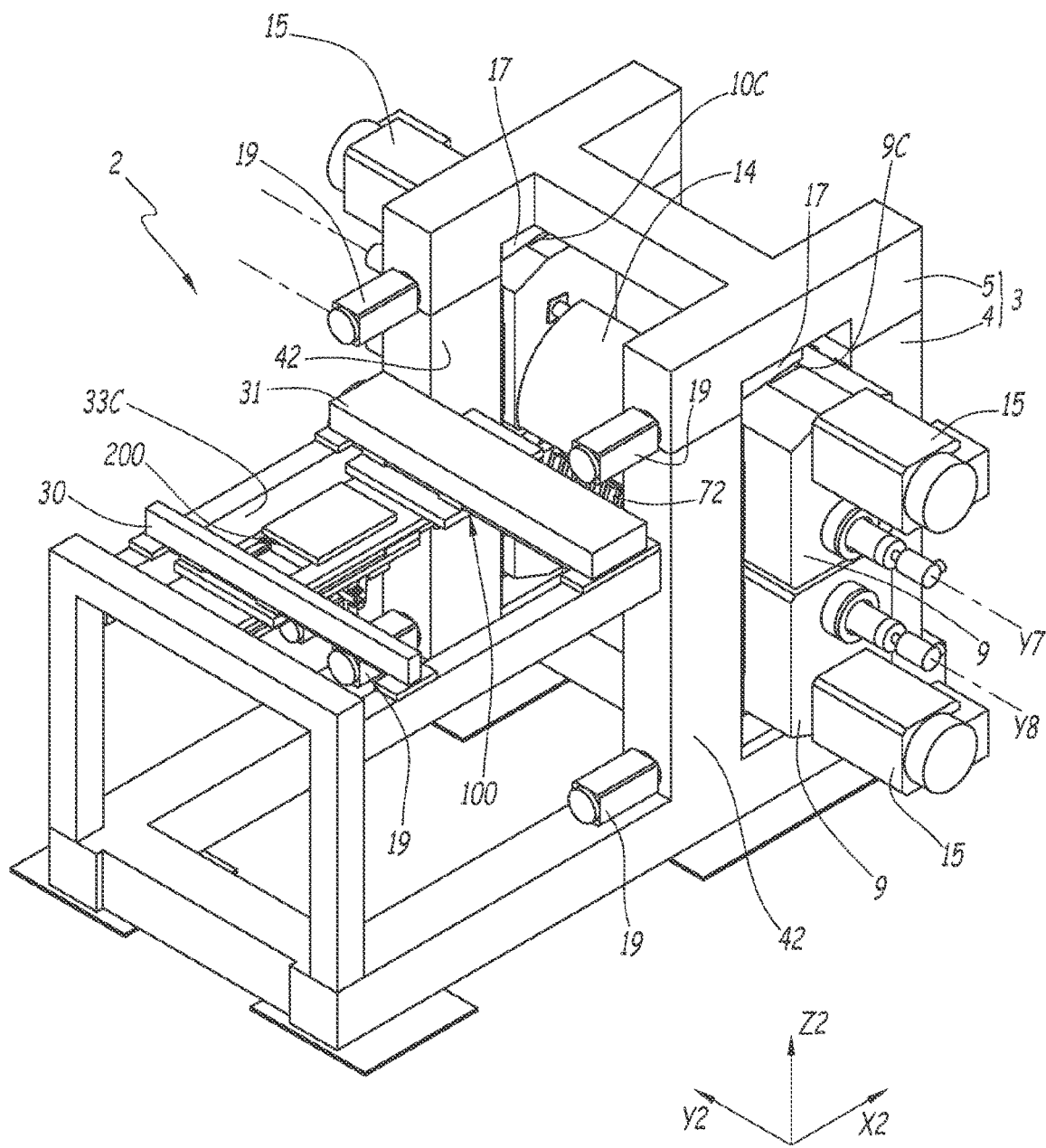
FIG. 12 is another exploded perspective view of the rolling mill shown in FIGS. 1 to 11, seen under a different angle from the angle of FIG. 1.

FIG. 11 shows four steps of a rolling process carried out by means of the rolling mill 2 of the invention.

In the first step shown in the upper left-hand part of FIG. 11, the tools 72 and 82 are correspondingly opposite the heating systems 14, so that it is possible to insert the blank E into a volume V defined vertically between the rollers 84 and 74. This volume V can be seen, inter alia, in FIG. 6. The insertion of the blank E into the volume V takes place along the direction of the arrow F1, which is parallel to the axis X2 and oriented along the same direction.

In the second step shown in the upper right-hand part of FIG. 11, the shaping rolls 7 and 8 are rotated synchronously about the axes Y7 and Y8, respectively, in two opposite directions, represented by the rotation arrows R7 and R8. Such double rotation has the effect of bringing the tools 72 and 82 into contact with the blank E which then begins a horizontal translational movement parallel to the axis X2, in the opposite direction to the insertion movement, the translational movement being represented by the arrows F2 in FIG. 11. At the moment of contact between the tools 72 and 82 and the blank E, the blank E should have been accelerated so as to be placed in the correct position along the axis X2 and at a theoretical speed of synchronization, along the axis with, the tools 72 and 82.

Because of the rotational movement of the shaping rolls 7 and 8 continues, as represented by the arrows R7 and R8, the tools 72 and 82 bear firmly against the blank E which same deform plastically and which same tend to drive towards the left of FIG. 11, along the direction of the arrows F2.

The movement continues, from the step shown in the upper right-hand part of FIG. 11 to the step shown in the lower left-hand part, then to the step represented in the lower right-hand part of the figure where the blank E leaves the contact with the tools 72 and 82 which are still rotating about the axes Y7 and Y8 and close to again reaching the starting position thereof represented in the upper left-hand part of the figure.

The precision of the adjustment of the vertical center distance E78 between the axes Y7 and Y8, obtained with the cam mechanism and the elastic system, is used for precisely adjusting the rolling force exerted by the tools 72 and 82 on the blank E between the steps correspondingly shown on the right in FIG. 11.

The manipulator subassembly 20 is configured for positively moving the blank E along the direction of the arrow F1, parallel to the axis X2, for reaching the position shown in the upper left-hand part of FIG. 11 and for accompanying the movement of the blank E under the action of the shaping rolls 7 and 8 during the following steps also shown in FIG. 11.

The manipulator subassembly 20 can be also used, once the step represented in the lower right-hand part of FIG. 11 is completed, for moving the blank E perpendicularly to the plane of FIG. 11, i.e. parallel to the axis Y2, in order to bring the blank opposite another individual part of the tools 72 and 82, leading to restarting the cycle shown in FIG. 11 with the other part of the tools without having to stop the rotation of the tools 72 and 82.

The manipulator subassembly 20 comprises a first beam 30 and a second beam 31 which are rigidly fixed bearing on two crosspieces 44 of the fixed structure 4. The beam 31 has a larger cross-section than the beam 30 because same supports the means of movement of the blank E parallel to the axis Y2.

A mobile assembly 33 is suspended from the beams 30 and 31 by means of slides 32 which are rigidly attached to a frame 33c of the mobile assembly 33 and are designed for moving, parallel to the axis Y2, along the rails 30R, 31R correspondingly provided on the lower faces of the beams 30 and 31. The movement of the mobile assembly 33 parallel to the axis Y2 and with respect to the beams 30 and 31 is obtained by means of a linear motor 100 which comprises a primary magnetic element 102 attached to the frame 33C of the mobile assembly 33 and which is supplied with current when the linear motor operates, so as to generate a variable magnetic field along a direction parallel to the axis Y2. By being attached to the beam 31, the secondary magnetic element is rigidly attached to the fixed structure 4 of the rolling mill 2. The linear motor 100 also comprises a secondary magnetic element 104 attached to the beam 31 and which, in practice, consists of a plurality of permanent magnets juxtaposed along a direction parallel to the axis Y2. The secondary magnetic element is not supplied with electric current.

The supply of the primary magnetic element 102 of the linear motor 100 can be used for exerting a magnetic force parallel to the axis Y2 between the elements 102 and 104 of the linear motor 100, which induces a controlled movement of the mobile assembly 33 under the beams 30 and 31, along a transverse direction Y33 parallel to the axis Y2.

The rails 31R are arranged on both sides of the magnetic elements 102 and 104 of the linear motor 100, along a direction parallel to the axis X2, and the same stands for the slides 32. The above facilitates the translation and increases the precision of the control on the position of the mobile assembly 33 with respect to the beam 31.

The mobile assembly 33 includes a carriage 35 to which the frame 33C is linked by a system of slides 34 rigidly attached to the carriage 35 and which move along rails 33R provided on the frame 33C. The longitudinal direction of the rails 33R is parallel to the axis Y2, so that the movement of the carriage 35, with respect to the frame 33C of the mobile assembly 33, takes place along a direction perpendicular to the direction of the movement of the mobile assembly 33 with respect to the beams 30 and 31.

A second linear motor 200 is used for controlling the movements of the carriage 35 with respect to the frame 33C of the mobile assembly 33 and comprises a primary magnetic element 202 mounted on a part of the frame 33C and supplied with electric current when the linear motor 200 is working, and a secondary magnetic element 204 mounted on the carriage which is not supplied with electric current and which consists, in practice, of a plurality of permanent magnets juxtaposed along a direction parallel to the axis X2. The current supply to the primary magnetic element 202 is used for generating a magnetic force between the elements 202 and 204 which has the effect of displacing the carriage 35 parallel to the axis X2, with respect to the frame 33C.

The rails 33R are arranged on both sides of the magnetic elements 202 and 204 of the linear motor 200, along a direction parallel to the axis X2, and the same stands for the slides 34. The above facilitates the translation and increases the precision of the control on the position of the carriage 35 with respect to the frame 33C of the mobile assembly 33.

The carriage 35 supports a workpiece gripping system 36 used for manipulating the blank E. The workpiece gripping system 36 comprises two bearings 37 rigidly linked to the carriage 35, and a hollow rod 38. A clamp 39 which comprises two jaws 39A and 39B, and a tie-rod mechanism 40 also belong to the workpiece gripping system 36 and are mounted at a first end of the rod 38. The tie-rod mechanism 40 is configured for transforming a translational movement of a push-rod 54 arranged inside the rod 38 into a movement of moving closer/moving apart the jaws 39A and 39B. The gripping rod 38 is mounted cantilevered, from the second end thereof opposite the end which supports the components 39 and 40, in one of the bearings 37.

The second end of the gripping rod 38 supports a pulley 38A surrounded by a belt 45 which also passes around a pulley 44A rotated by an electric stepper motor 44, which forms an electric motor for the angular orientation of the clamp 39. Indeed, by activating the electric motor 44 it is possible to rotate the pulley 38A, and hence the gripping rod 38 about the longitudinal axis X38 thereof which is parallel to the axis X2. It is in this way possible to angularly orient the tie-rod mechanism 40, and hence the blank E held by the clamp 39, about the axis X38. Since the orientation of the blank E about the axis X38 is controlled by means of the electric motor 44, the angular amplitude of the movement of adaptation of the orientation of the blank E about the axis is at the choice of the user of the billet rolling mill 2 since, once the electric motor 44 is selected, the orientation depends only on the duration of activation of the motor. The angular amplitude is not limited by the stroke of a ram. Thereby, compared to some known billet rolling mills, wherein a ram is used for rotating a blank through about a central axis of a clamp, the billet rolling mill 2 of the present invention has better flexibility since same allows the blank E to have an angular movement about the axis X38 with an amplitude freely chosen by the user, where the amplitude can be even greater than 360°.

The carriage 35 also carries an electric stepper motor 42 which drives a screw-nut system 41 which transforms the rotary movement of the output shaft 42A of the motor 42 into a translational movement of the push-rod 54 along the axis X38. It is thereby possible to control, by means of the motor 42, the opening-closing movement of the clamp 39, by moving the push-rod 54 along the axis X38 in order to actuate the tie-rod mechanism 40.

The stepper motors 42 and 44 are controlled by an electronic unit (not shown) which can be either the same as, or different from, the unit which drives the motors 15 and 19.

A spring system 43 is interposed between the screw-nut mechanism 41 and the push-rod 54. The spring system is used for absorbing any impact in the screw-nut system 41, whereas the jaws 39A and 39B of the clamp 39 have already reached the position of clamping of the blank E. The spring system 43 makes an elastic connection possible along the closing direction of the clamp 39, between the nut of the screw-nut system 41 and the push-rod 54.

Due to the use of the linear motor 200, the movement of the carriage 35 parallel to the axis X38, and hence of the clamp 39 which the carriage supports, is controlled in a precise way both during the introduction of the blank E between the shaping rolls 7 and 8, along the direction of the arrow F1 in FIG. 11, and when the blank E is pushed back towards the beam 30 during the rolling thereof, along the direction of the arrows F2 in FIG. 11. More particularly, the linear motor 200 is used for accelerating the blank along the direction of rolling X38, between the first step shown in the upper left-hand part of FIG. 11 and the second step shown in the upper right-hand part of the figure, for inserting the blank between the tools 72 and 82 and that same is placed in the correct position along the axis X2 and at a speed, along said axis, which is synchronized with the speed of the tools 72 and 82. The acceleration force of the blank E during the movement thereof along the direction of the arrow F1 in FIG. 11, in particular during the insertion of the blank between the tools 72 and 82, is obtained according to the supply of the primary magnetic element 202 of the linear motor 200. From the second step shown in the upper right-hand part of FIG. 11, depending on the power supply of the primary magnetic element 202 of the linear motor 200, it is possible that the motor exerts either a tensile force which tends to extract the blank E from the gap defined between the tools 72 and 82, or a braking force which tends to limit the speed of ejection of the blank E along the direction of rolling defined by the axis X38. In all cases, the linear speed of movement of the blank E along the direction of rolling is controlled by the linear motor. The linear speed is thus known with precision, without needing estimates based on the speed of rotation of the shaping rolls 7 and 8.

Precise control of the linear speed of movement of the blank E along the direction of rolling parallel to the axis X2 is used for optimizing the rolling effect obtained between the tools 72 and 82. Furthermore, the low inertia of the linear motor 200, compared with the inertia of a ram or of a conventional electric motor, makes it possible to reach high speeds of movement of the carriage 35, and thus of the clamp 39, along the axis X38. Thus, the optimized use of the linear motor 2, in particular the generation of the aforementioned acceleration, tensile and braking forces, makes it possible to increase the quality of the rolled products obtained with the billet rolling mill 2.

Indeed, pulling or braking the blank during rolling between the rolls improves the quality of rolling, while maintaining a high production rate. E.g., a tensile force exerted on a product with a small cross-section at the outlet of the rolling thereof between the rolling tools 72 and 82, improves the linearity of the product. On the other hand, braking a product with a large cross-section at the end of the rolling thereof between the rolling tools, improves the filling of the rolling profile defined between the tools.

On the other hand, the linear motor 100 is used for rapidly moving the mobile assembly 33 and the elements which same supports, including the carriage 35 and the clamp 39, along the transverse direction Y33. It is in this way possible to quickly realign the blank E with a part of the tools 72 and 82 which would be used for a subsequent rolling step.

The linear motors 100 and 200 thus contribute to the reduction of the cycle time of rolling a blank E in the billet rolling mill 2. The motors are controlled by an electronic unit (not shown), which can be either the same as, or different from, the unit which controls the motors 19, 42 and 44.

The linear motors 100 and 200 can be commercial products, such as the motors marketed by SIEMENS under the references 1FN3450-2WE00-0BA3 or 1 FN3300-2WE00-0BA3, or equipment developed on the same principle, especially for the present application.

In the embodiment shown, no linear motor is provided in the interface zone between the mobile assembly 33 and the beam 30. However, it is possible to incorporate a linear motor therein as well. The choice to use one or two linear motors and the location of the linear motor(s) is made taking into account the moving masses of the mobile assembly 33. According to a variant of the invention (not shown), the linear motor 100 can be arranged in the vicinity of the beam 30, without a linear motor being arranged in the vicinity of the beam 31.

Even if the use of the linear motor 100 is particularly advantageous, it is possible to envisage, according to a variant of the invention (not shown), using, for driving the mobile assembly 33 parallel to the axis Y2, a rotary electric motor and a rotary/linear motion conversion system known per se.

According to another variant of the invention (not shown), the guide rails of the linear motors 100 and 200 can be provided on the frame 33C and on the carriage 35, respectively, whereas the slides are provided on the beam 31 and on the frame 33C, respectively. According to another variant (not shown), the mounting of the magnetic elements 102 and 104 can be reversed, the primary magnetic element 102 being mounted on the beam 31, whereas the secondary magnetic element 104 is mounted on the frame 33C. Similarly, the mounting of the magnetic elements 202 and 204 can be reversed, the primary magnetic element 202 being mounted on the carriage 35, whereas the secondary magnetic element 204 is mounted on the frame 33C.

According to another variant of the invention (not shown), the reduction gears 152 can be replaced by belt systems, or even removed if the speed of rotation of the output shafts of the motors 15 is compatible with a direct drive of the rollers 74 and 84. According to another variant of the invention (not shown), the shaping rolls 7 and 8 are each rotated by a single electric motor 15.

In a variant of the invention (not shown), the number of springs 55 can be different from 4. Furthermore, the springs 55 of the elastic system can be replaced by other elastic components, such as elastomer blocks or gas springs.

In a variant of the invention (not shown), the axis X17 of movement of a wedge 17 can be parallel to the axis Y2 or inclined with respect to the axes X2 and Y2, while remaining perpendicular to the axis Z2. According to another variant of the invention (not shown), the shaping rolls 7 and 8 are not arranged one above the other, but side by side. In such case, the center distance between the axes of rotation thereof is horizontal and the direction of rolling is vertical. The fixed structure 4 of the billet rolling mill 2 and the manipulator subassembly 20 are then adapted accordingly.

The aforementioned embodiment and variants can be combined for generating new embodiments of the invention as defined by the enclosed set of claims.

The invention claimed is:

1. A billet rolling mill comprising two shaping rollers for shaping a blank to be shaped, each shaping roll being provided with at least one rolling tool and rotated about an axis of rotation by at least one respective drive motor, and a manipulator subassembly for moving the blank with respect to the shaping rolls, the manipulator subassembly comprising a clamp for gripping the blank, a carriage for moving the clamp at least along a direction of rolling of the blank and at least one linear motor for moving the carriage along the direction of rolling, wherein the direction of rolling is perpendicular to the axis of rotation of the rolling tool and the linear motor is configured to successively:

in a first operation, accelerate the blank, so as to insert the blank between the rolling tools at a speed synchronized with the speed of the rolling tools, and in a second operation, selectively exert on the blank in the process of being rolled either a tensile force which tends to extract the blank from a gap defined between the rolling tools, or a braking force which tends to limit a speed of ejection of the blank.

2. The rolling mill according to claim 1, wherein the carriage is also movable along a transverse direction perpendicular to the direction of rolling and parallel to the axes of rotation of the shaping rolls, and in that the manipulator subassembly comprises at least one linear motor for moving the carriage along the transverse direction.

3. The rolling mill according to claim 1, wherein each linear motor comprises a primary magnetic element supplied with current, and a secondary magnetic element not supplied with current and a guiding system for guiding the primary and secondary magnetic elements in relative translation.

4. The rolling mill according to claim 3, wherein the guiding system comprise at least one rail mounted on a first part of the manipulator subassembly, which carries a first magnetic element among the primary magnetic element and the secondary magnetic element, and a slide mounted on a second part of the manipulator subassembly, which carries the second magnetic element among the primary magnetic element and the secondary magnetic element.

5. The rolling mill according to claim 4, wherein the guiding system comprise two sets of rails and slides, arranged on both sides of the primary magnetic element and of the secondary magnetic element.

6. The rolling mill according to claim 2, wherein each linear motor comprises a primary magnetic element supplied with current, and a secondary magnetic element not supplied with current and a system for guiding the primary and secondary magnetic elements in relative translation, wherein the primary magnetic element of the linear motor for moving the carriage along the direction of rolling is mounted on a frame movable in translation along the transverse direction and wherein the secondary magnetic element of the linear motor for moving the carriage along the direction of rolling, is mounted on the carriage.

7. The rolling mill according to claim 2, wherein each linear motor comprises a primary magnetic element supplied with current, and a secondary magnetic element not supplied with current and a system for guiding the primary and secondary magnetic elements in relative translation, wherein the primary magnetic element of the linear motor for moving the carriage along the transverse direction is mounted on a frame movable in translation along the transverse direction, and wherein the secondary magnetic element of the linear motor for moving the carriage along the transverse direction is rigidly attached to a fixed structure of the billet rolling mill.

8. The rolling mill according to claim 1, wherein a center distance between the axes of rotation of the shaping rolls is adjustable by a cam mechanism which exerts a force on the shaping rolls tending to reduce the center distance, and an elastic system which exerts a force on the shaping rolls tending to increase the center distance.

9. The rolling mill according to claim 1, wherein the carriage carries an electric motor for maneuvering the clamp.

10. The rolling mill according to claim 9, wherein a damper system is arranged between an output shaft of the electric motor and a push-rod for maneuvering an opening/closing mechanism of the clamp.

11. The rolling mill according to claim 1, wherein the carriage carries an electric orientation motor for an angular orientation of the clamp about an axis parallel to the direction of rolling.

12. The rolling mill according to claim 11, wherein the electric orientation motor controls the angular orientation of the clamp about the axis parallel to the direction of rolling over a range an angular amplitude of which depends on an activation time of the electric orientation motor.

13. The rolling mill according to claim 11, wherein the carriage carries an electric motor for maneuvering the clamp and wherein the electric orientation motor rotates a hollow rod at one end of which is mounted a mechanism for opening/closing the clamp whereas the electric motor for maneuvering the clamp translates a push-rod arranged inside the rod and which acts on the opening/closing mechanism of the clamp.

14. The rolling mill according to claim 1, wherein each shaping roll is rotated about the axis of rotation thereof by two electric motors, one of which is mounted near each of the ends thereof.

15. A method for controlling a rolling mill comprising two shaping rolls for shaping a blank to be shaped, each shaping roll being provided with at least one rolling tool and rotated about an axis of rotation by at least one respective drive motor, and a manipulator subassembly for moving the blank with respect to the shaping rolls, the manipulator subassembly comprising a clamp for gripping the blank, a carriage for moving the clamp at least along one direction of rolling of the blank and at least one linear motor for moving the carriage along the direction of rolling, wherein the method comprises operations implemented by powering a primary magnetic element of the linear motor and comprising:
- a first operation of accelerating the blank, in order to insert same between the rolling tools, at a speed synchronized with the speed of the rolling tools, followed by
- a second operation of selectively exerting on the blank in the process of being rolled, either a tensile force which tends to extract the blank from a gap defined between the rolling tools, or a braking force which tends to limit a speed of ejection of the blank.

16. The rolling mill according to claim 14, wherein a reduction gear is interposed between an output shaft of each electric motor and the adjacent end of a roller of the shaping roll driven by the motor.

17. A billet rolling mill comprising two shaping rollers for shaping a blank to be shaped, each shaping roll being provided with at least one rolling tool and rotated about an axis of rotation by at least one respective drive motor, and a manipulator subassembly for moving the blank with respect to the shaping rolls, the manipulator subassembly comprising a clamp for gripping the blank, a carriage for moving the clamp at least along a direction of rolling of the blank and at least one linear motor for moving the carriage along the direction of rolling, wherein the direction of rolling is perpendicular to the axis of rotation of the rolling tool and the linear motor is configured for accelerating the blank, so as to insert the blank between the rolling tools at a speed synchronized with the speed of the rolling tools, and to selectively exert on the blank either a tensile force which tends to extract the blank from a gap defined between the rolling tools, or a braking force which tends to limit a speed of ejection of the blank, a center distance between the axes of rotation of the shaping rolls is adjustable by a cam mechanism which exerts a force on the shaping rolls tending to reduce the center distance, and an elastic system which exerts a force on the shaping rolls tending to increase the center distance.

18. A billet rolling mill comprising two shaping rollers for shaping a blank to be shaped, each shaping roll being provided with at least one rolling tool and rotated about an axis of rotation by at least one respective drive motor, and a manipulator subassembly for moving the blank with respect to the shaping rolls, the manipulator subassembly comprising a clamp for gripping the blank, a carriage for moving the clamp at least along a direction of rolling of the blank and at least one linear motor for moving the carriage along the direction of rolling, wherein the direction of rolling is perpendicular to the axis of rotation of the rolling tool and the linear motor is configured for accelerating the blank, so as to insert the blank between the rolling tools at a speed synchronized with the speed of the rolling tools, and to selectively exert on the blank either a tensile force which tends to extract the blank from a gap defined between the rolling tools, or a braking force which tends to limit a speed of ejection of the blank, the carriage carries an electric motor for an angular orientation of the clamp about an axis parallel to the direction of rolling, and the electric orientation motor controls the angular orientation of the clamp about the axis parallel to the direction of rolling over a range an angular amplitude of which depends on an activation time of the electric orientation motor.

* * * * *